(12) United States Patent
McGarry et al.

(10) Patent No.: US 9,253,111 B2
(45) Date of Patent: Feb. 2, 2016

(54) BANDWIDTH DISTRIBUTION BASED ON PRIOR GRANTING CYCLES

(71) Applicant: Futurewei Technologies, Inc., Plano, TX (US)

(72) Inventors: Michael P. McGarry, El Paso, TX (US); Yuanqiu Luo, Cranbury, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 89 days.

(21) Appl. No.: 14/191,162

(22) Filed: Feb. 26, 2014

(65) Prior Publication Data

US 2014/0241723 A1    Aug. 28, 2014

Related U.S. Application Data

(60) Provisional application No. 61/770,234, filed on Feb. 27, 2013.

(51) Int. Cl.
| | |
|---|---|
| *H04L 1/00* | (2006.01) |
| *H04L 12/873* | (2013.01) |
| *H04J 14/02* | (2006.01) |
| *H04L 12/931* | (2013.01) |
| *H04L 12/863* | (2013.01) |
| *H04Q 11/00* | (2006.01) |
| *H04L 12/761* | (2013.01) |

(52) U.S. Cl.
CPC ............ *H04L 47/527* (2013.01); *H04J 14/0245* (2013.01); *H04L 47/6265* (2013.01); *H04L 49/357* (2013.01); *H04Q 11/0067* (2013.01); *H04J 2014/0253* (2013.01); *H04L 45/16* (2013.01)

(58) Field of Classification Search
None
See application file for complete search history.

(56) References Cited

U.S. PATENT DOCUMENTS 7,808,913 B2 * 10/2010 Ansari et al. ............... 370/241
2006/0013138 A1 * 1/2006 Haran et al. ............... 370/236

FOREIGN PATENT DOCUMENTS

| EP | 1328094 A1 | 7/2003 |
|---|---|---|
| WO | 2007065801 A1 | 6/2007 |

OTHER PUBLICATIONS

Byun et al, Dynamic bandwidth allocation algorithm in ethernet passive optical networks, ELECTRONIC LETTERS, vol. 39, No. 13, 2 pages, Jun. 2003.*

(Continued)

*Primary Examiner* — Frank Duong
(74) *Attorney, Agent, or Firm* — Conley Rose, P.C.; Grant Rodolph; Jonathan K. Polk

(57) ABSTRACT

An apparatus comprises a receiver configured to receive a reported queue depth for a current granting cycle, and a processor coupled to the receiver and configured to determine accumulated bandwidth credits from at least one granting cycle prior to the current granting cycle. An apparatus comprises a transmitter configured to transmit a reported queue depth for a second granting cycle, a processor coupled to the transmitter, and a receiver coupled to the processor and configured to receive a transmission grant size that is based on the reported queue depth and accumulated bandwidth credits from a first granting cycle prior to the second granting cycle.

24 Claims, 3 Drawing Sheets

(56) References Cited

OTHER PUBLICATIONS

"IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Physical Layer Specifications and Management Parameters for 10 Gb/s Passive Optical Networks," IEEE 802.3av, Oct. 30, 2009, 236 pages.

"IEEE Standard for Information Technology—Telecommunications and Information Exchange Between Systems—Local and Metropolitan Area Networks—Specific Requirements,Part 3: Carrier Sense Multiple Access with Collision Detection (CSMA/CD) Access Method and Physical Layer Specifications—Amendment: Media Access Control Parameters, Physical Layers, and Management Parameters for Subscriber Access Networks," IEEE 802.3ah, Sep. 7, 2004, 640 pages.

"Series G: Transmission Systems and Media, Digital Systems and Networks—Digital Sections and Digital Line System—Optical Line Systems for Local and Access Networks—Broadband Optical Access Systems Based on Passive Optical Networks (PON)," ITU-T Telecommunication Standardization Section of ITU, G.983.1, Jan. 2005, 124 pages.

"Series G: Transmission Systems and Media, Digital Systems and Networks—Digital Sections and Digital Line System—Optical Line Systems for Local and Access Networks—Broadband Optical Access Systems Based on Passive Optical Networks (PON)—Amendment 1: PICS for OLT and ONU," ITU-T Telecommunication Standardization Section of ITU, G.983.1, Amendment 1, May 2005, 60 pages.

"Series G: Transmission Systems and Media, Digital Systems and Networks—Digital Sections and Digital Line System—Optical Line Systems for Local and Access Networks—ONT Management and Control Interface Specification for B-PON," ITU-T Telecommunication Standardization Section of ITU, G.983.2, Jul. 2005, 370 pages.

"Series G: Transmission Systems and Media, Digital Systems and Networks—Digital Sections and Digital Line System—Optical Line Systems for Local and Access Networks—ONT Management and Control Interface Specification for B-PON—Amendment 1: Omnibus Improvements for OMCI," ITU-T Telecommunication Standardization Section of ITU, G.983.2 Amendment 1, Mar. 2006, 198 pages.

"Series G: Transmission Systems and Media, Digital Systems and Networks—Digital Sections and Digital Line System—Optical Line Systems for Local and Access Networks—ONT Management and Control Interface Specification for B-PON—Amendment 2: ONT Management and Control Interface Specification for B-PON," ITU-T Telecommunication Standardization Section of ITU, G.983.2 Amendment 2, Jan. 2007, 64 pages.

"Series G: Transmission Systems and Media, Digital Systems and Networks—Digital Sections and Digital Line System—Optical Line Systems for Local and Access Networks—A Broadband Optical Access System with Increased Service Capability by Wavelength Allocation," ITU-T Telecommunication Standardization Section of ITU, G.983.3, Mar. 2001, 59 pages.

"Series G: Transmission Systems and Media, Digital Systems and Networks—Digital Sections and Digital Line System—Optical Line Systems for Local and Access Networks—A Broadband Optical Access System with Increased Service Capability by Wavelength Allocation—Amendment 1," ITU-T Telecommunication Standardization Section of ITU, G.983.3 Amendment 1, Jun. 2002, 16 pages.

"Series G: Transmission Systems and Media, Digital Systems and Networks—Digital Sections and Digital Line System—Optical Line Systems for Local and Access Networks—A Broadband Optical Access System with Increased Service Capability by Wavelength Allocation—Amendment 2," ITU-T Telecommunication Standardization Section of ITU, G.983.3 Amendment 2, Jul. 2005, 12 pages.

"Series G: Transmission Systems and Media, Digital Systems and Networks—Digital Sections and Digital Line System—Optical Line Systems for Local and Access Networks—A Broadband Optical Access System with Increased Service Capability Using Dynamic Bandwidth Assignment," ITU-T Telecommunication Standardization Section of ITU, G.983.4 Nov. 2001, 92 pages.

"Series G: Transmission Systems and Media, Digital Systems and Networks—Digital Sections and Digital Line System—Optical Line Systems for Local and Access Networks—A Broadband Optical Access System with Increased Service Capability Using Dynamic Bandwidth Assignment—Amendment 1: New Annex A—Performance Monitoring Parameters," ITU-T Telecommunication Standardization Section of ITU, G.983.4 Amendment 1, Dec. 2003, 12 pages.

"Series G: Transmission Systems and Media, Digital Systems and Networks—Digital Sections and Digital Line System—Optical Line Systems for Local and Access Networks—A Broadband Optical Access System with Increased Service Capability Using Dynamic Bandwidth Assignment—Corrigendum 1," ITU-T Telecommunication Standardization Section of ITU, G.983.4 Corrigendum 1, Jan. 2005, 8 pages.

"Series G: Transmission Systems and Media, Digital Systems and Networks—Digital Sections and Digital Line System—Optical Line Systems for Local and Access Networks—A Broadband Optical Access System with Enhanced Survivability" ITU-T Telecommunication Standardization Section of ITU, G.983.5, Jan. 2002, 60 pages.

"Series G: Transmission Systems and Media, Digital Systems and Networks—Digital Sections and Digital Line System—Optical Line Systems for Local and Access Networks—Gigabit-Capable Passive Optical Networks (GPON): General Characteristics," ITU-T Telecommunication Standardization Section of ITU, G.984.1, Mar. 2008, 43 pages.

"Series G: Transmission Systems and Media, Digital Systems and Networks—Digital Sections and Digital Line System—Optical Line Systems for Local and Access Networks—Gigabit-Capable Passive Optical Networks (GPON): General Characteristics—Amendment 1," ITU-T Telecommunication Standardization Section of ITU, G.984.1 Amendment 1, Oct. 2009, 8 pages.

"Series G: Transmission Systems and Media, Digital Systems and Networks—Digital Sections and Digital Line System—Optical Line Systems for Local and Access Networks—Gigabit-Capable Passive Optical Networks (GPON): General Characteristics—Amendment 2," ITU-T Telecommunication Standardization Section of ITU, G.984.1 Amendment 2, Apr. 2012, 16 pages.

"Series G: Transmission Systems and Media, Digital Systems and Networks—Digital Sections and Digital Line System—Optical Line Systems for Local and Access Networks—Gigabit-Capable Passive Optical Networks (GPON): Physical Media Dependent (PMD) Layer Specification," ITU-T Telecommunication Standardization Section of ITU, G.984.2, Mar. 2003, 38 pages.

"Series G: Transmission Systems and Media, Digital Systems and Networks—Digital Sections and Digital Line System—Optical Line Systems for Local and Access Networks—Gigabit-Capable Passive Optical Networks (GPON): Physical Media Dependent (PMD) Layer Specification—Amendment 1: New Appendix III—Industry Best Practice for 2.488 Gbit/s Downstream, 1.244 Gbit/s Upstream G-PON," ITU-T Telecommunication Standardization Section of ITU, G.984.2 Amendment 1, Feb. 2006, 12 pages.

"Series G: Transmission Systems and Media, Digital Systems and Networks, Digital Sections and Digital Line Systems—Optical Line Systems for Local and Access Networks, Gigabit-Capable Passive Optical Networks (G-PON): Physical Media Dependent (PMD) Layer Specification, Amendment 2," ITU-T Telecommunication Standardization Sector of ITU, G.984.2, Amendment 2, Mar. 2008, 16 pages.

"Series G: Transmission Systems and Media Digital Systems and Networks, Digital Sections and Digital Line System—Optical Line Systems for Local and Access Networks, Gigabit-Capable Passive Optical Networks (G-PON): Transmission Convergence Layer Specification," ITU-T, Telecommunication Standardization Sector of ITU, G.984.3, Mar. 2008, 146 pages.

"Series G: Transmission Systems and Media, Digital Systems and Networks, Digital Sections and Digital Line System—Optical Line Systems for Local and Access Networks, Gigabit-Capable Passive Optical Networks (G-PON): Transmission Convergence Layer Specification, Amendment 1—Specification of the ONU Registra-

(56) References Cited

OTHER PUBLICATIONS tion Method and Various Clarifications," ITU-T, Telecommunication Standardization Sector of ITU, G.984.3, Amendment 1, Feb. 2009, 16 pages.
"Series G: Transmission Systems and Media, Digital Systems and Networks, Digital Sections and Digital Line System—Optical Line Systems for Local and Access Networks, Gigabit-Capable Passive Optical Networks (G-PON): Transmission Convergence Layer Spevification, Amendment 2: Time-of-Day Distribution and Maintenance Updates and Clarifications," ITU-T, Telecommunication Standardization Sector of ITU, G.984.3, Amendment 2, Nov. 2009, 18 pages.
"Series G: Transmission Systems and Media, Digital Systems and Networks, Digital Sections and Digital Line System—Optical Line Systems for Local and Access Networks, Gigabit-Capable Passive Optical Networks (G-PON): Transmission Convergence Layer Specification, Amendment 3," ITU-T, Telecommunication Standardization Sector of ITU, G.984.3 Amendment 3, Apr. 2012, 18 pages.
"Series G: Transmission Systems and Media Digital Systems and Networks, Digital Sections and Digital Line System—Optical Line Systems for Local and Access Networks, Gigabit-Capable Passive Optical Networks (G-PON): ONT Management and Control Interface Specification," ITU-T, Telecommunication Standardization Sector of ITU, G.984.4, Feb. 2008, 430 pages.
"Series G: Transmission Systems and Media Digital Systems and Networks, Digital Sections and Digital Line System—Optical Line Systems for Local and Access Networks, Gigabit-Capable Passive Optical Networks (G-PON): ONT Management and Control Interface Specification, Amendment 1" ITU-T, Telecommunication Standardization Sector of ITU, G.984.4, Amendment 1, Jun. 2009, 92 pages.
"Series G: Transmission Systems and Media Digital Systems and Networks, Digital Sections and Digital Line System—Optical Line Systems for Local and Access Networks, Gigabit-Capable Passive Optical Networks (G-PON): ONT Management and Control Interface Specification, Amendment 2: Changes and Extensions to the OMCI, editorial Clarification and Corrections," ITU-T, Telecommunication Standardization Sector of ITU, G.984.4, Amendment 2, Nov. 2009, 164 pages.
"Series G: Transmission Systems and Media, Digital Systems and Networks, Digital Sections and Digital Line System—Optical Line Systems for Local and Access Networks, Gigabit-Capable Passive Optical Networks (G-PON): ONT Management and Control Interface Specification, Amendment 3: Clarification of Scope of Application," ITU-T Telecommunication Standardization Sector of ITU, G.984A, Amendment 3, Jul. 2010, 10 pages.
"Series G: Transmission Systems and Media, Digital Systems and Networks, Digital Sections and Digital Line Systems—Optical Line Systems for Local and Access Networks, Gibabit-Capable Passive Optical Networks (G-PON): ONT Management and Control Interface Specification, Corrigendum 1," ITU-T Telecommunication Standardization Sector of ITU, G.984.4, Corrigendum 1, Mar. 2010, 8 pages.
"Series G: Transmission Systems and Media, Digital Systems and Networks, Digital Sections and Digital Line System—Optical Line Systems for Local and Access Networks, Gigabit-Capable Passive Optical Networks (G-PON): Enhancement Band," ITU-T Telecommunication Standardization Sector of ITU, G.984.5, Sep. 2007, 22 pages.
"Series G: Transmission Systems and Media, Digital Systems and Networks, Digital Sections and Digital Line Systems—Optical Line Systems for Local and Access Networks, Gigabit-Capable Passive Optical Networks (G-PON): Enhancement Band, Amendment 1," ITU-T Telecommunication Standardization Sector of ITU, G.984.5, Amendment 1, Oct. 2009, 12 pages.
"Series G: Transmission Systems and Media, Digital Systems and Networks, Digital Sections and Digital Line System—Optical Line Systems for Local and Access Networks, Gigabit-Capable Passive Optical Networks (GPON): Reach Extension," ITU-T Telecommunication Standardization Sector of ITU, G.984.6, Mar. 2008, 40 pages.
"Series G: Transmission Systems and Media, Digital Systems and Networks, Digital Sections and Digital Line Systems—Optical Line Systems for Local and Access Networks," Gigabit-Capable Passive Optical Networks (GPON): Reach Extension, Amendment 1: Wavelength-Converting, Continuous Mode, and 1:N-Protected Range Extenders, ITU-T Telecommunication Standardization Sector of ITU, G.984.6, Amendment 1, Nov. 2009, 28 pages.
"Series G: Transmission Systems and Media, Digital Systems and Networks, Digital Sections and Digital Line System—Optical Line Systems for Local and Access Networks, Gigabit-Capable Passive Optical Networks (G-PON): Reach Extension, Amendment 2," ITU-T Telecommunication Standardization Sector of ITU, G.984.6, Amendment 2, May 2012, 16 pages.
"Series G: Transmission Systems and Media, Digital Systems and Networks, Digital Sections and Digital Line System—Optical Line Systems for Local and Access Networks, Gigabit-Capable Passive Optical Networks (GPON): Long Reach," ITU-T Telecommunication Standardization Sector of ITU, G.984.7, Jul. 2010, 14 pages.
Naser, H., et al., "A Joint-ONU Interval-Based Dynamic Scheduling Algorithm for Ethernet Passive Optical Networks," IEEE/ACM Transactions on Networking, vol. 14, No. 4, Aug. 1, 2006, pp. 889-899.
Choudhury, P., et al., "Efficient Queue Based Dynamic Bandwidth Allocation Scheme for Ethernet PONs," Nov. 1, 2007, pp. 2183-2187.
Foreign Communication From A Counterpart Application, PCT Application No. PCT/US2014/018757, International Search Report dated Jun. 18, 2014, 5 pages.
Foreign Communication From A Counterpart Application, PCT Application No. PCT/US2014/018757, Written Opinion dated Jun. 18, 2014, 7 pages.

* cited by examiner

BANDWIDTH DISTRIBUTION BASED ON PRIOR GRANTING CYCLES

CROSS-REFERENCE TO RELATED APPLICATIONS

This application claims priority to U.S. provisional patent application No. 61/770,234 filed Feb. 27, 2013 by Michael P. McGarry, et al., and titled "One Grant Cycle Back Online Excess Bandwidth Distribution," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In order to improve bandwidth efficiency, many broadband access networks provide a communications medium that may be shared among a plurality of nodes, or points, to form a point-to-multipoint (P2MP) network. In the area of optical networks, a passive optical network (PON) provides a P2MP network architecture with an optical line terminal (OLT) at a central office (CO), an optical distribution network (ODN), and a plurality of optical network units (ONUs) at customer premises. Ethernet passive optical network (EPON) is a PON standard developed by the Institute of Electrical and Electronics Engineers (IEEE) and is specified in IEEE 802.3ah, which is incorporated by reference. Gigabit-capable PON (G-PON) is a PON standard developed by the International Telecommunication Union Telecommunication Standardization Section (ITU-T) and is specified in the ITU-T G.984 series, which is incorporated by reference. In the area of wireless networks, Wi-Fi and Long Term Evolution (LTE), which are incorporated by reference, similarly provide P2MP network architectures.

In a media access control (MAC) layer of a P2MP network, an upstream bandwidth may be assigned based on polling. Polling may refer to arbitration of access to a network, particularly bandwidth assignment. Polling is an important mechanism that may directly affect network efficiency.

SUMMARY

In one embodiment, the disclosure includes an apparatus comprising a receiver configured to receive a reported queue depth for a current granting cycle, and a processor coupled to the receiver and configured to determine accumulated bandwidth credits from at least one granting cycle prior to the current granting cycle.

In another embodiment, the disclosure includes an apparatus comprising a transmitter configured to transmit a reported queue depth for a second granting cycle, a processor coupled to the transmitter, and a receiver coupled to the processor and configured to receive a transmission grant size that is based on the reported queue depth and accumulated bandwidth credits from a first granting cycle prior to the second granting cycle.

In yet another embodiment, the disclosure includes a method comprising determining a maximum transmission grant limit, receiving a plurality of reported queue depths for a prior granting cycle, and determining a number of credits available for a current granting cycle based on the maximum transmission grant limit and the plurality of reported queue depths for the prior granting cycle.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
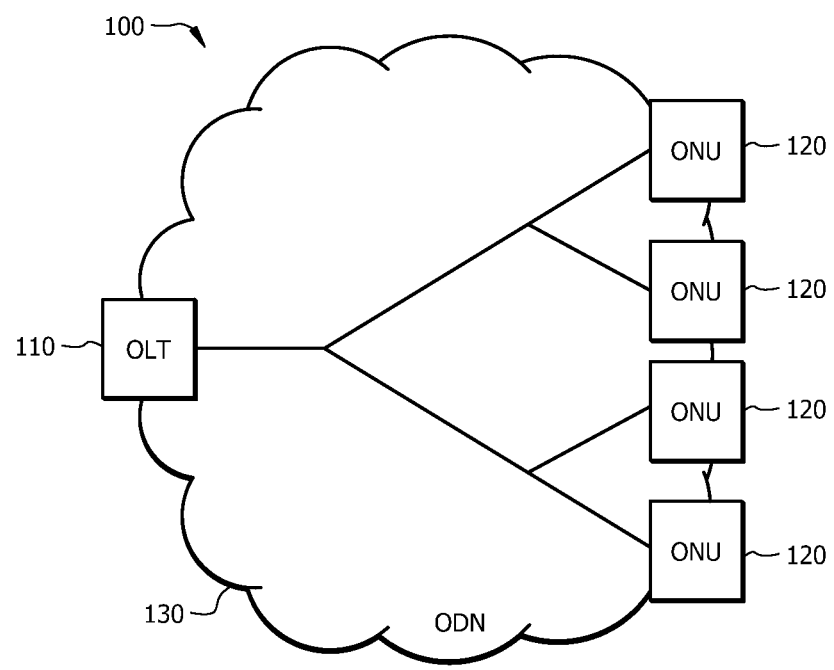
FIG. 1 is a schematic diagram of a PON according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

When a network node, such as an ONU, first accesses the network, a central arbiter, such as the OLT, may begin with the ONU an initialization procedure, which may include polling. In addition to when an ONU first accesses the network, the OLT may poll the ONUs at any other time the OLT desires. Polling may comprise the OLT sending to the ONU a gate message, or transmission access message, which may be a request for the ONU's bandwidth requirement and other information; the ONU checking its queue for that information; the ONU sending to the OLT an upstream transmission window, which may comprise a report message with the ONU's bandwidth requirement, as well as user data; and the OLT sending to the ONU the OLT's bandwidth assignment and other information. Generally, a polling time may refer to the total time for those events to occur, in other words, the round trip time of the messages, the processing time at the OLT and the ONU, and the queuing time at the ONU. Specifically, the polling time may refer to the total time from the initiation of polling signaling from the OLT to the time the first bit transmitted from the ONU is received at the OLT. In some networks, multiple ONUs may be connected in parallel.

As mentioned above, P2MP networks may provide a communications medium that may be shared among a plurality of nodes; thus, there may be a need to implement a scheme to facilitate that sharing. The scheme may be necessary to efficiently allocate bandwidth for upstream transmissions from the nodes, such as ONUs, to a central arbiter, such as the OLT. Bandwidth assignment schemes may generally include fixed assignment schemes and dynamic assignment schemes. In fixed assignment schemes, the OLT may assign each ONU a fixed bandwidth. There are at least two types of dynamic assignment schemes, upper-bound schemes and polling schemes. In an upper-bound scheme, the OLT may assign each ONU an upper bound to its bandwidth. When the ONU requires less than or as much as the upper bound, the OLT may grant the required bandwidth. When the ONU requires more than the upper bound, the OLT may grant the upper bound. In a polling scheme, the OLT may, for each transmission cycle poll ONUs for their bandwidth requirements and assign bandwidth based on those bandwidth requirements. Online polling occurs when the OLT assigns bandwidth to a single ONU after receiving that ONU's bandwidth requirement without regard to the other ONUs' bandwidth requirements. Offline polling occurs when the OLT assigns bandwidth to the ONUs only after receiving all of the ONUs' bandwidth requirements.

Fixed assignment schemes are inflexible because each ONU maintains its bandwidth regardless of how much data it must transmit, and fixed assignment schemes are wasteful because the shared medium may not be fully utilized when ONUs transmit less than their assigned bandwidth. Dynamic assignment schemes that implement offline polling take longer to complete because they require that all ONUs report their bandwidth requirements before the OLT assigns bandwidth. It is therefore desirable to have a bandwidth allocation scheme that is both flexible and online.

Disclosed herein is a flexible, online bandwidth allocation scheme that may improve channel utilization, reduce queuing delays, and otherwise improve network efficiency. The scheme may apply to a current granting cycle excess bandwidth allocation from prior granting cycles. A granting cycle may refer to a length of time to poll each ONU, a granting process may refer to a process of granting upstream transmission access to ONUs, and polling may refer to the mechanism for granting upstream transmission access to ONUs. The scheme may apply excess bandwidth allocation by distributing accumulated bandwidth credits, which may refer to bits of unused bandwidth. The scheme may apply to any P2MP networks, for instance cable television (CATV), that employ time division multiple access (TDMA) or other transmission techniques that require bandwidth allocation among multiple nodes. The scheme may be implemented at a MAC layer.

MAC layer online grant scheduling may significantly improve channel utilization, especially when polling times are large. Polling times may be large when nodes are distant from each other and therefore have longer propagation delays, as well as when networks have multiple stages, for instance a PON in conjunction with another network such as a coaxial network. The scheme may be flexible because it may allocate different bandwidths to the ONUs depending on the ONUs' needs, and the scheme may be online because it may allocate bandwidths to the ONUs after hearing from each ONU instead of after hearing from all of the ONUs. Online bandwidth allocation may provide for improved channel utilization, and excess bandwidth allocation may provide for improved queuing delays.

FIG. 1 is a schematic diagram of a PON 100 according to an embodiment of the disclosure. The PON 100 may comprise an OLT 110; a plurality of ONUs 120; and an optical distribution network (ODN) 130, which may be coupled to the OLT 110 and the ONUs 120. The PON 100 may be a communications network that does not require any active components to distribute data between the OLT 110 and the ONUs 120. Instead, the PON 100 may use passive optical components in the ODN 130 to distribute data between the OLT 110 and the ONUs 120. The PON 100 may be a Next Generation Access (NGA) system, such as a 10 gigabit per second (Gbps) GPON (XG-PON), which may have a downstream bandwidth of about 10 Gbps and an upstream bandwidth of at least about 2.5 Gbps. Alternatively, the PON 100 may be any Ethernet based network, such as an EPON, a 10 Gigabit EPON as defined by the IEEE 802.3av standard, an asynchronous transfer mode PON (APON), a broadband PON (BPON) defined by the ITU-T G.983 standard, a GPON, or a wavelength division multiplexed (WDM) PON (WPON), which are incorporated by reference.

The OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120 and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter (not shown) that converts the network protocol into the PON protocol. The OLT 110 converter may also convert the PON protocol into the network protocol. The OLT 110 may be typically located at a central location, such as a central office, but may be located at other locations as well.

The ODN 130 may be a data distribution system, which may comprise optical fiber cables, couplers, splitters, distributors, or other equipment. The optical fiber cables, couplers, splitters, distributors, or other equipment may be passive optical components that do not require any power to distribute data signals between the OLT 110 and the ONUs 120. Alternatively, the ODN 130 may comprise active components, such as optical amplifiers. The ODN 130 may extend from the OLT 110 to the ONUs 120 in a branching configuration as shown in FIG. 1, but may be alternatively configured in any other P2MP configuration.

The ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. The ONUs 120 may comprise a converter (not shown) that converts the optical signal into electrical signals, such as signals in the Ethernet or asynchronous transfer mode (ATM) protocol, and a second transmitter (not shown) that may send the electrical signals to a customer device (not shown). The ONUs may comprise a second receiver (not shown) that may receive electrical signals from the customer device. In some embodiments, ONUs 120 and optical network terminals (ONTs) are similar, so the terms may be used interchangeably. The ONUs 120 may be typically located at distributed locations, such as the customer premises, but may be located at other locations as well.

The OLT 110 may need to allocate bandwidth among the ONUs 120 in a particular granting cycle, for instance grating cycle n. In the granting cycle n, the disclosed scheme may provide for the OLT 110 allocating bandwidth, in the form of transmission grants, to the ONUs 120 using credits from prior granting cycles n−1, n−2, and so on. The ONUs 120 may then transmit data payloads based on the transmission grants until another granting cycle begins. The scheme is described more fully below.

First, the accumulated bandwidth credits may be determined. The number of accumulated bandwidth credits accumulated from granting cycle n−1 and available for granting cycle n may be expressed by the following equation:

$$E(n) = \sum_{i=1}^{M} \max[0, L - R(i, n-1)], \quad (1)$$

where E(n) is the number of credits (in bits) available for granting cycle n, M is the total number of ONUs 120, or network nodes, requiring bandwidth allocation, L is the maximum transmission grant limit (in bits) for a single granting cycle, and R(i, n−1) is the reported queue depth (in bits) for node i at the end of its transmission grant during granting cycle n−1. In other words, L is the maximum bandwidth node i could use and R is the bandwidth node i needs to use. E(n) may be referred to as a pool. Queue depth may refer to a to-be-transmitted data size buffered at a transmitter. Consequently, equation 1 provides that, if node i does not need all of its allocated bandwidth, then the excess bandwidth accumulates in the pool in the form of credits for subsequent grant cycles. If, however, node i needs more than its allocated bandwidth, then no excess bandwidth is accumulated.

Though equation 1 contemplates credits accumulated form granting cycle n−1, as discussed above, E(n) may also accumulate credits from granting cycle n−2, n−3, and so on. In that case, $$E(n) = \sum_{i=1, x=1}^{M, Y} \max[0, L - R(i, n-x)], \quad (8)$$

where x and Y are integers equal to one or greater. In order to prevent credit accumulation beyond what the PON 100 may accommodate, Y in equation 8 may be set to an arbitrary number.

Alternatively, E(n) may be set to a maximum number or some other mechanism may be used in order to decay E(n) in a reasonable manner.

Figure 2:
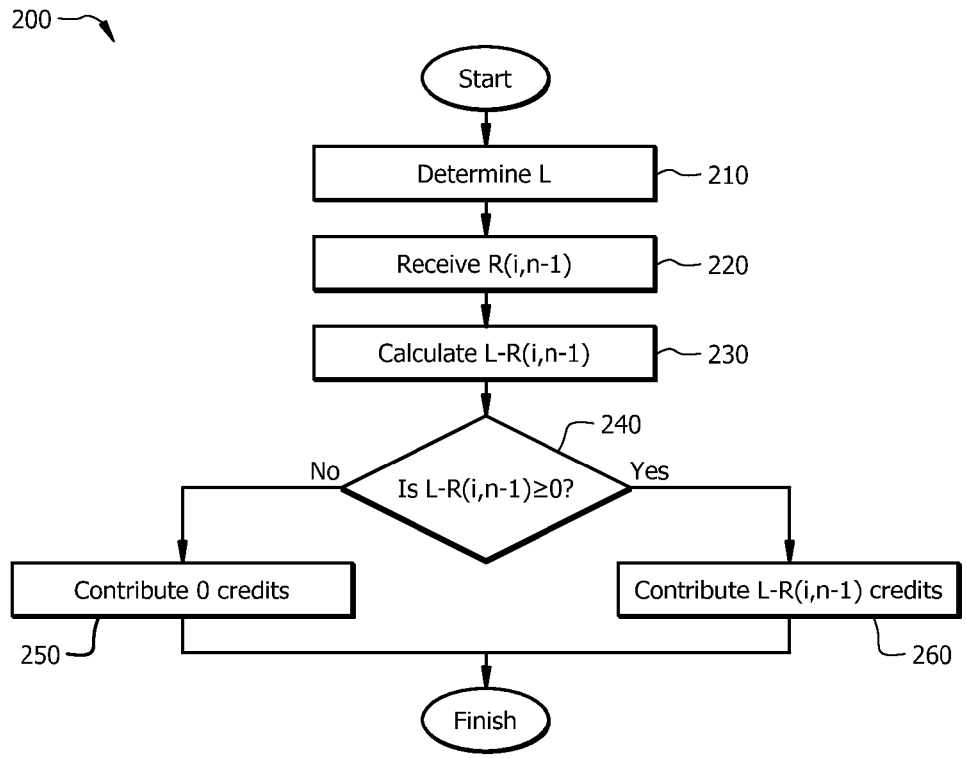
FIG. 2 is a flowchart of a method of accumulating credits according to an embodiment of the disclosure.

FIG. 2 is a flowchart of a method 200 of accumulating credits according to an embodiment of the disclosure. The method 200 may be implemented at the OLT 110. At step 210, L, the maximum transmission grant limit (in bits), may be determined. At step 220, R(i,n−1), the reported queue depth (in bits) for node i at the end of its transmission grant during granting cycle n−1, may be received. R(i,n−1) may be received from the ONU 120₁. Steps 210 and 220 may be rearranged as their relative order may not affect the method 200. At step 230, L−R(i,n−1) may be calculated. At decision diamond 240, it may be determined whether or not L−R(i,n−1) is greater than or equal to 0. If not, then, at step 250, 0 credits may be contributed to E(n), the pool. If so, then, at step 260, L−R(i,n−1) credits may be contributed to the pool. The method 200 may be repeated for nodes 1 through M and for granting cycles n−1 through n−y.

Second, the excess credit allocation may be determined. If the reported queue depth of node i during granting cycle n is less than L, in other words, if R(i, n)<L, then the following equation may apply:

$$G(i,n) = R(i,n), \quad (2)$$

where G(i, n) is the size (in bits) of the transmission grant for node i in granting cycle n. If, however, the reported queue depth of node i during granting cycle n is greater than L, in other words, if R(i, n)≥L, then node i may access credits in the pool. For example, node i may access the number of credits in the pool divided by the number of nodes as shown in the following equation:

$$e(i, n) = \frac{E(n)}{M}, \quad (3)$$

where e(i, n) is the number (in bits) of credits, in excess of L, available to node i in granting cycle n. In that case, if R(i, n)≥L, then the following equation may apply:

$$G(i,n) = \min[L + e(i,n), R(i,n)], \quad (4)$$

where G(i, n) is once again the size (in bits) of the transmission grant for node i in granting cycle n. Equation 4 shows that node i will receive either its reported queue depth or the maximum transmission grant limit plus the number of credits available to node i.

Figure 3:
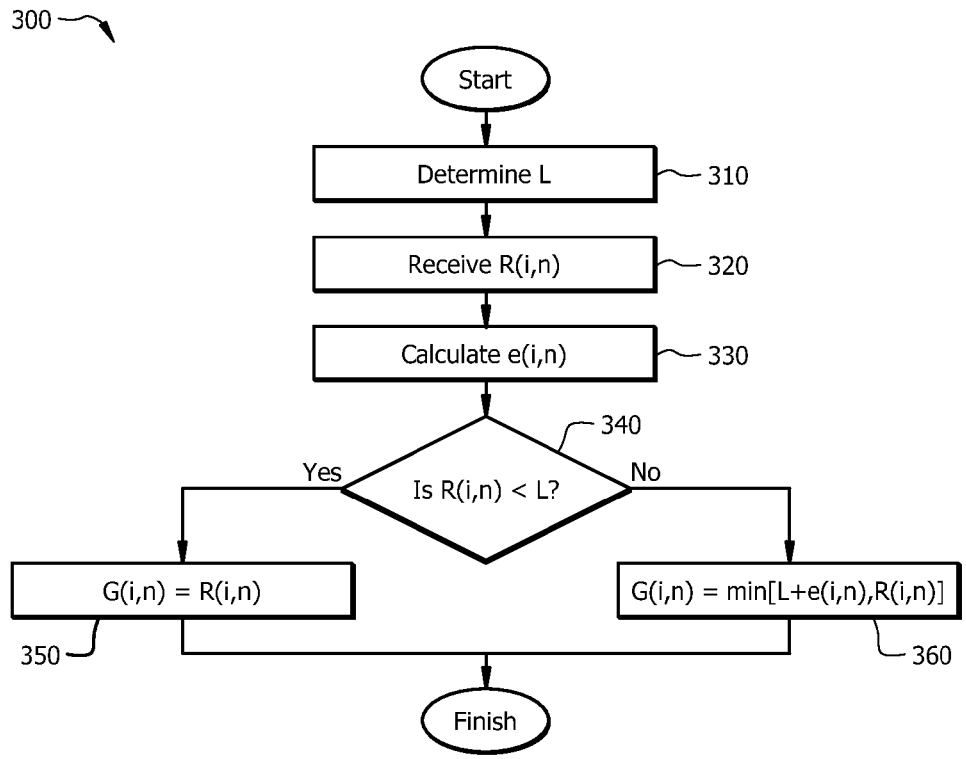
FIG. 3 is a flowchart of a method of allocating excess credits according to an embodiment of the disclosure.

FIG. 3 is a flowchart of a method 300 of allocating excess credits according to an embodiment of the disclosure. The method 300 may be implemented at the OLT 110. At step 310, L, the maximum transmission grant limit (in bits), may be determined. At step 320, R(i,n), the reported queue depth (in bits) for node i at the end of its transmission grant during granting cycle n, may be received. R(i,n) may be received from the ONU 120₁. At step 330, e(i,n), the number (in bits) of credits, in excess of L, available to node I in granting cycle n, may be calculated. e(i,n) may be calculated to be $$\frac{E(n)}{M},$$

where E(n) is the pool and M is the number of ONUs 120. Steps 310-330 may be rearranged as their relative order may not affect the method 300. At decision diamond 340, it may be determined whether or not R(i,n) is less than L. If so, then, at step 350, G(i,n), the size (in bits) of the transmission grant for node i in granting cycle n, may be equal to R(i,n). If not, then, at step 360, G(i,n) may be equal to the minimum of L+e(i,n) and R(i,n). The method 300 may be repeated for nodes 1 through M.

Third, granting cycle bounds may be determined. A lower bound for granting cycle length may be when all of the ONUs' 120 reported queue depths are zero and transmission grants accommodate queue depth report messages whose sizes are negligible. In that case, $$\min[\Gamma(n)] = \sum_{i=1}^{M} \Delta(i, n), \quad (5)$$

where Γ(n) is the length (in seconds) of granting cycle n and Δ(i, n) is the idle time (in seconds) between the transmission grant of node i−1 and node i during granting cycle n. An upper bound for granting cycle length may be when all of the ONUs' 120 reported queue depths for granting cycle n−1 are zero and all of the ONUs' 120 reported queue depths for granting cycle n exceed two times the transmission grant limit. In that case, $$E(n) = \sum_{i=1}^{M} \max[0, L - R(i, n-1)]$$

$$E(n) = \sum_{i=1}^{M} (L - 0)$$

$$E(n) = ML. \quad (6)$$

As a result, $$\max[\Gamma(n)] = \sum_{i=1}^{M} \left[ \frac{L}{R} + \frac{\frac{ML}{M}}{R} + \Delta(i,n) \right] \quad (7)$$

$$\max[\Gamma(n)] = \frac{2ML}{R} + \sum_{i=1}^{M} \Delta(i,n),$$

where R is a rate of transmission (in bits per second) of a transmission channel.

Figure 4:
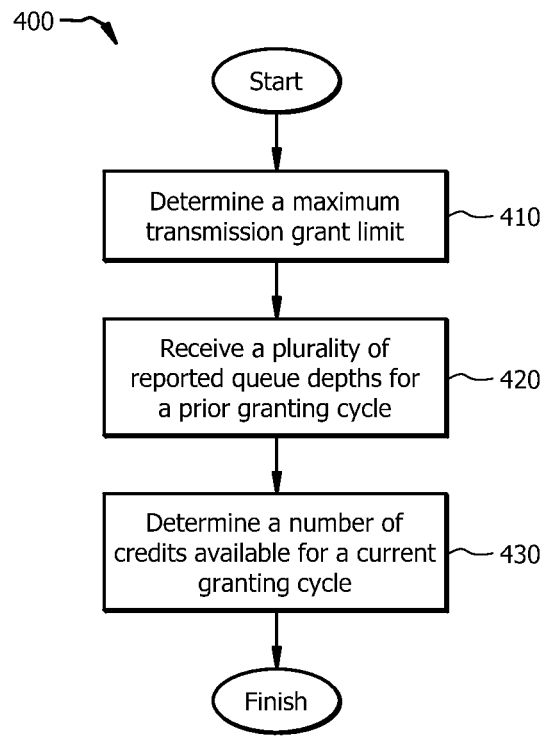
FIG. 4 is a flowchart of a method of determining a number of credits available for a current granting cycle according to an embodiment of the disclosure.

FIG. 4 is a flowchart illustrating a method 400 of determining a number of credits available for a current granting cycle according to an embodiment of the disclosure. The method 400 may be implemented at the OLT 110. At step 410, a maximum transmission grant limit may be determined. The maximum transmission grant limit may be represented as L. At step 420, a plurality of reported queue depths for a prior granting cycle may be received. The plurality of reported queue depths for the prior granting cycle may be represented as $\sum_{i=1}^{M} R(i, n-1)$, where M is a number of ONUs 120, or nodes, and n−1 is the prior granting cycle. The plurality of queue depths for the prior granting cycle may be received from the ONUs 120. At step 430, a number of credits available for a current granting cycle may be determined. The number of credits available for the current granting cycle may be determined based on the maximum transmission grant limit and the plurality of reported queue depths for the prior granting cycle. The number of credits available for the current granting cycle may be represented as $E(n)=\sum_{i=1}^{M} \max[0, L-R(i, n-1)]$.

Figure 5:
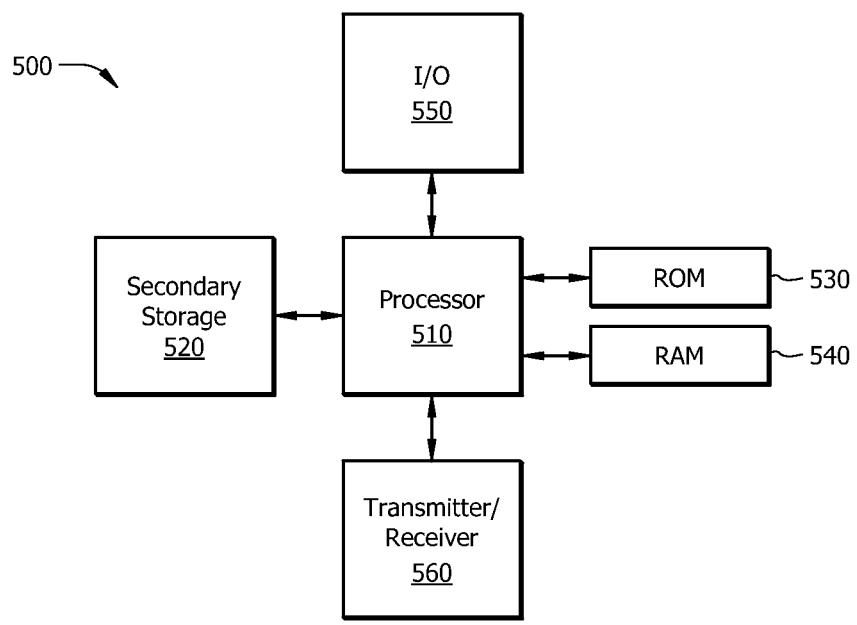
FIG. 5 is a schematic diagram of a computer system according to an embodiment of the disclosure.

FIG. 5 is a schematic diagram of a computer system 500 according to an embodiment of the disclosure. The system 500 may be suitable for implementing the disclosed embodiments. The system 500 may comprise a processor 510 that is in communication with memory devices, including secondary storage 520, read only memory (ROM) 530, random access memory (RAM) 540, input/output (I/O) devices 550, and a transmitter/receiver 560. Although illustrated as a single processor, the processor 510 is not so limited and may comprise multiple processors. The processor 510 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 510 may be implemented using hardware or a combination of hardware and software.

The secondary storage 520 may comprise one or more disk drives or tape drives and may be used for non-volatile storage of data and as an overflow data storage device if the RAM 540 is not large enough to hold all working data. The secondary storage 520 may be used to store programs that are loaded into the RAM 540 when such programs are selected for execution. The ROM 530 may be used to store instructions and data that are read during program execution. The ROM 530 may be a non-volatile memory device that may have a small memory capacity relative to the larger memory capacity of the secondary storage 520. The RAM 540 may be used to store volatile data and perhaps to store instructions. Access to both the ROM 530 and the RAM 540 may be faster than to the secondary storage 520.

The transmitter/receiver 560 may serve as an output and/or input device of the system 500. For example, if the transmitter/receiver 560 is acting as a transmitter, it may transmit data out of the system 500. If the transmitter/receiver 560 is acting as a receiver, it may receive data into the system 500. The transmitter/receiver 560 may take the form of modems; modem banks; Ethernet cards; universal serial bus (USB) interface cards; serial interfaces; token ring cards; fiber distributed data interface (FDDI) cards; wireless local area network (WLAN) cards; radio transceiver cards such as code division multiple access (CDMA), global system for mobile communications (GSM), LTE, worldwide interoperability for microwave access (WiMAX), and/or other air interface protocol radio transceiver cards; and other well-known network devices. The transmitter/receiver 560 may enable the processor 510 to communicate with the Internet or one or more intranets. The I/O devices 550 may comprise a video monitor, liquid crystal display (LCD), touch screen display, or other type of video display for displaying video, and may also include a video recording device for capturing video. The I/O devices 550 may also include one or more keyboards, mice, track balls, or other well-known input devices.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a receiver configured to receive a reported queue depth for a current granting cycle; and
a processor coupled to the receiver and configured to determine accumulated bandwidth credits from at least one granting cycle prior to the current granting cycle,
wherein a granting cycle is a period of time in which all active user nodes can be polled and transmit data.

2. The apparatus of claim 1, wherein the processor is further configured to determine a transmission grant size based on the reported queue depth.

3. The apparatus of claim 2, wherein the processor is further configured to determine the transmission grant size based on the accumulated bandwidth credits.

4. The apparatus of claim 3, further comprising a transmitter coupled to the processor and configured to transmit the transmission grant size.

5. The apparatus of claim 4, wherein the receiver is configured to receive the reported queue depth from a first node of the active user nodes, and wherein the processor is configured to determine the transmission grant size after receiving the reported queue depth, but before receiving additional reported queue depths from additional nodes of the active user nodes.

6. The apparatus of claim 5, wherein the apparatus is an optical line terminal (OLT), the first node is an optical network unit (ONU), and the additional nodes are ONUs, and wherein the OLT and the ONUs form a point-to-multipoint (P2MP) passive optical network (PON).

7. The apparatus of claim 1, wherein the processor is further configured to determine the accumulated bandwidth credits from at least two granting cycles prior to the current granting cycle.

8. The apparatus of claim 1, wherein the accumulated bandwidth credits are independent of classes of service associated with the active user nodes.

9. An apparatus comprising:
a transmitter configured to transmit a reported queue depth for a second granting cycle;
a processor coupled to the transmitter; and
a receiver coupled to the processor and configured to receive a transmission grant size that is based on the reported queue depth and accumulated bandwidth credits from a first granting cycle prior to the second granting cycle,
wherein a granting cycle is a period of time in which all active user nodes can be polled and transmit data.

10. The apparatus of claim 9, wherein the processor is configured to:
process the transmission grant size; and
generate a data payload based on the transmission grant size.

11. The apparatus of claim 10, wherein the transmitter is further configured to transmit the data payload.

12. The apparatus of claim 9, wherein the apparatus is one of the active user nodes and is an optical network unit (ONU).

13. A method comprising:
determining, by a processor., a maximum transmission grant limit;
receiving, by a receiver, a plurality of reported queue depths for a prior granting cycle; and
determining, by the processor., a number of credits available for a current granting cycle based on the maximum transmission grant limit and the plurality of reported queue depths for the prior granting cycle, but independent of classes of service associated with active user nodes.

14. The method of claim 13, further comprising:
receiving a reported queue depth for the current granting cycle;
determining a share of the number of credits available for the current granting cycle; and
determining a transmission grant size for the current granting cycle based on the maximum transmission grant limit, the share of the number of credits available for the current granting cycle, and the reported queue depth for the current granting cycle.

15. The method of claim 14, wherein the maximum transmission grant limit is represented as L, wherein the plurality of reported queue depths for the prior granting cycle is $\Sigma_{i=1}^{M} R(i,n-1)$, represented as 1 where M is a number of nodes and n-1 is the prior granting cycle, and wherein the number of credits available for the current granting cycle is represented as E(n), where n is the current granting cycle and $E(n) = \Sigma_{i=1}^{M} \max[0, L - R(i, n-1)]$.

16. The method of claim 15, wherein E(n) further includes credits from granting cycles prior to n-1.

17. The method of claim 16, further comprising decaying E(n).

18. The method of claim 15, wherein the reported queue depth for the current granting cycle is represented as R(i,n), wherein the share of the number of credits available for the current granting cycle is represented as e(i,n), where $$e(i, n) = \frac{E(n)}{M},$$

and wherein the transmission grant size for the current granting cycle is represented as G(i,n).

19. The method of claim 18, wherein, when R(i,n) <L, G(i,n) =R(i,n), and wherein, when R(i,n) ≥L, G(i,n) =min[L+ e(i,n),R(i,n)].

20. The method of claim 19, further comprising transmitting G(i,n) in a media access control (MAC) layer message.

21. The method of claim 15, wherein a length of the current granting cycle is represented as $\Gamma(n)$, a minimum length of the current granting cycle is represented as $\min[\Gamma(n)]$, a maximum length of the current granting cycle is represented as $\max[\Gamma(n)]$, and where $\min[\Gamma(n)] \leq \Gamma(n) \leq \max[\Gamma(n)]$.

22. The method of claim 21, wherein $\min[\Gamma(n)] = \Sigma_{i=1}^{M} \Delta(i, n)$, where $\Delta(i,n)$ is an idle time between a transmission grant of a node i-1 and a node i.

23. The method of claim 22, wherein $$\max[\Gamma(n)] = \frac{2ML}{R} + \sum_{i=1}^{M} \Delta(i, n),$$

where $\Delta(i,n)$ is an idle time between a transmission grant of a node i-1 and a node i.

24. The method of claim 13, wherein a granting cycle is a period of time in which all of the active user nodes can be polled and transmit data.

\* \* \* \* \*